Feb. 24, 1970   R. A. HEITZMAN   3,496,804
BANDSAW AUTOMATIC SWAGING APPARATUS
Filed April 10, 1968   2 Sheets-Sheet 1

INVENTOR.
RUSSELL A. HEITZMAN
BY Eugene D. Farley
ATTY.

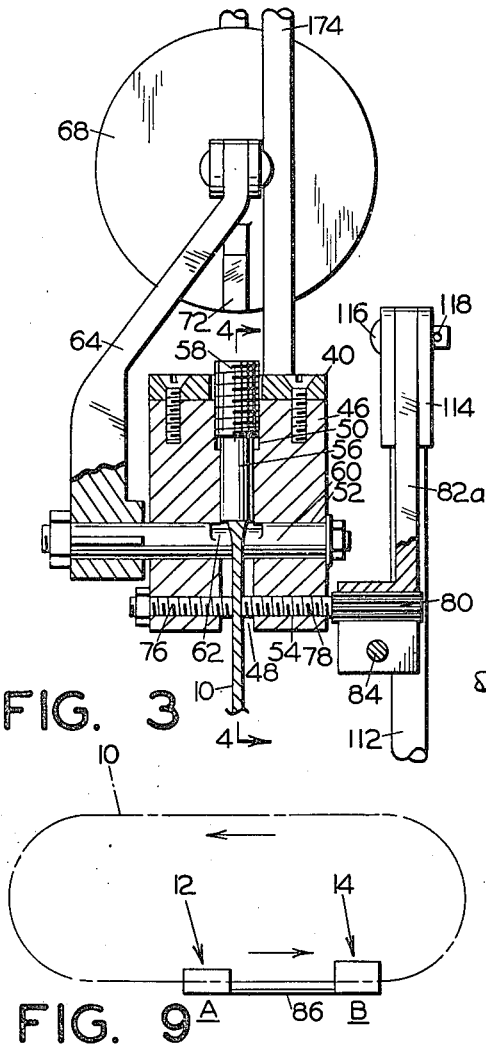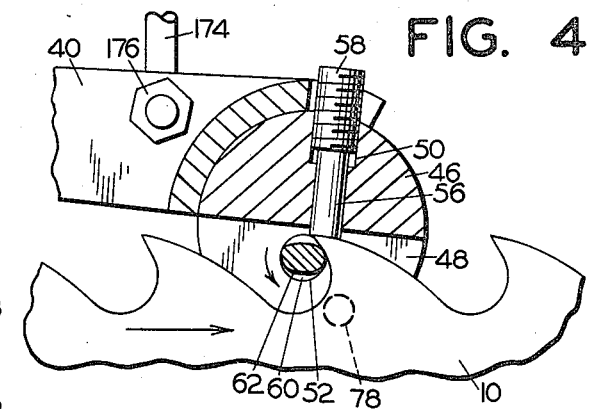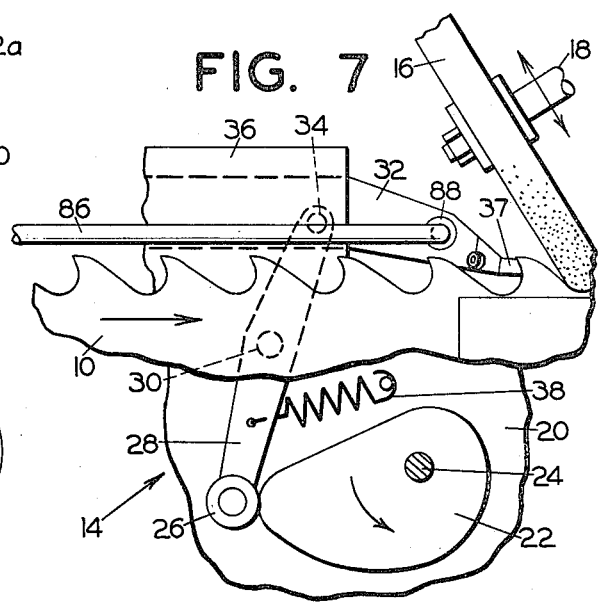

United States Patent Office 3,496,804
Patented Feb. 24, 1970

3,496,804
BANDSAW AUTOMATIC SWAGING APPARATUS
Russell A. Heitzman, Wrangell, Alaska
(1133 Main St., Lebanon. Oreg. 97355)
Filed Apr. 10, 1968, Ser. No. 720,120
Int. Cl. B23d 63/06
U.S. Cl. 76—51
8 Claims

ABSTRACT OF THE DISCLOSURE

A bandsaw swaging control unit actuates sequentially saw clamp means and saw tooth swaging means as the saw is advanced one tooth at a time past tooth swaging and grinding stations.

---

This invention pertains to a control unit for rendering automatic the operation of a swage used in conjunction with grinding apparatus to sharpen saws, particularly sawmill bandsaws.

In sawmill operation, logs are broken down into lumber by means of heavy gauge bandsaws of substantial size. It is critical to the performance of the saws, and to the economical utilization of the logs, that the saw teeth be maintained sharp and correctly proportioned.

The saw sharpening operation may consist of the following steps: First, any bent teeth are straightened. Next, the teeth are swaged one at a time to flatten them and provide a correct cutting area. Next, the swaged teeth are ground one at a time to provide cutting edges. Next the teeth are sharped one at a time by pressing them laterally with dies to determine their width which, in turn, determines the width of the saw kerf. Finally, the shaped teeth again are ground to give them their final cutting edges.

The application of these procedures to a heavy duty bandsaw measuring 60 feet or more in length is a time consuming operation. It conventionally is carried out by mounting the saw in a suitable guide with the saw teeth angled upwardly and rearwardly. A suitable drive is applied to the saw for advancing it one tooth at a time with respect to a swaging station, where the teeth are swaged, and to a grinding station, where they are sharpened. These two operations normally are carried out independently of each other by two operators, one located at each station.

It is the general purpose of this invention to provide a control for sawmill swaging apparatus which coordinates the swaging apparatus with the cooperating grinding apparatus so that the teeth of the saw are swaged automatically as the saw is advanced tooth by tooth through the grinding apparatus. The need for an operator at the swaging station thus is eliminated. In addition, the resulting apparatus is characterized by the following important advantages.

(1) It may be applied to existing saw sharpening units without substantial modification thereof.

(2) It is transferable from one saw sharpening station to another.

(3) It is installed quickly and easily.

(4) It may be converted to manual operation quickly and easily where this is desirable or necessary.

(5) Its use results in uniform swaging of the teeth.

(6) It is so constructed that it is impossible to double swage a given tooth upon inadvertent failure of the saw drive, thereby preventing damage to the saw.

(7) It is stablized effectively so that the swage always is oriented properly to the saw.

(8) It is fully powered so that a minimum of effort on the part of the operator is required.

The manner in which the foregoing and other objects of this invention are accomplished will be apparent from the accompanying specification and claims considered together with the drawings, wherein:

FIG. 3 is a transverse sectional view taken along line 3—3 of FIG. 1;

FIG. 4 is a transverse detail sectional view taken along line 4—4 of FIG. 3;

FIG. 5 is a fragmentary plan view of the swage control looking in the direction of the arrows 5—5 of FIG. 2, partly broken away to show interior construction;

FIG. 6 is a fragmentary view in section taken along line 6—6 of FIG. 5;

FIG. 7 is a fragmentary schematic view of a grinding unit used to sharpen the teeth swaged by the apparatus of the previously mentioned figures;

FIG. 8 is a fragmentary elevation of a stabilizing counterweight used with the swage; and FIG. 9 is a schematic plan view of a saw maunted for swaging and sharpening at cooperating swaging and sharpening stations, using the herein described automatically controlled swaging apparatus.

Figure 1:
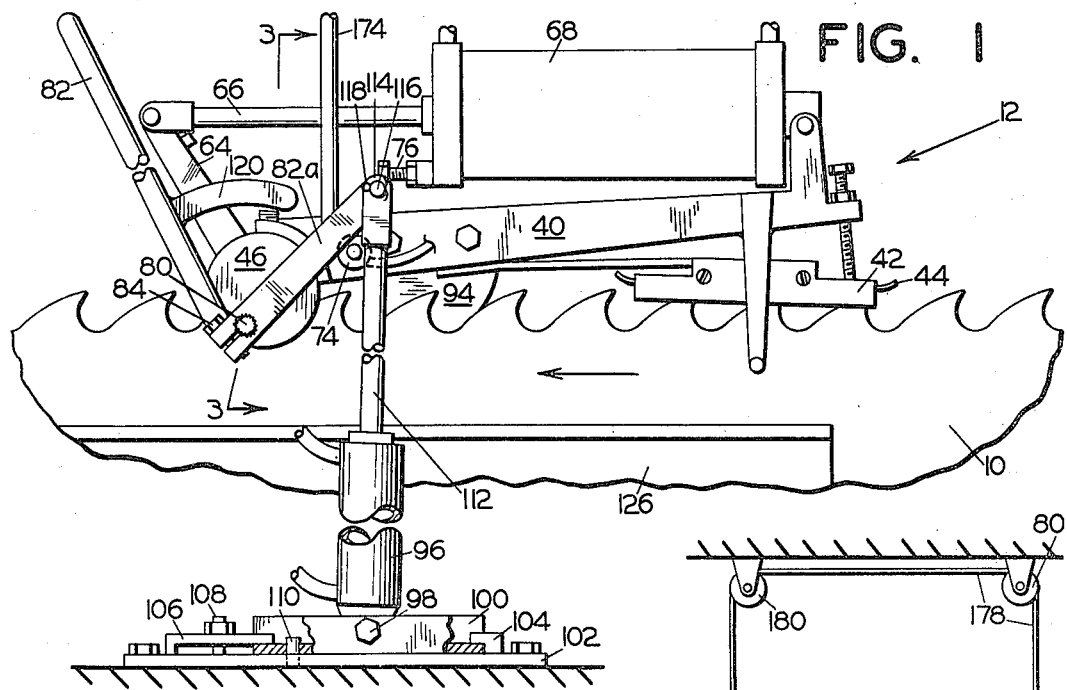
FIG. 1 is a view in side elevation of saw swaging apparatus with the herein described control applied thereto, viewed from one side.

As indicated above, the control unit of my invention is adapted for use with saw sharpening apparatus comprising a saw swage at a first station, a saw grinder at a second station and drive means for moving the saw past the two stations, one tooth at a time. The swage is provided with a saw clamp and a swaging die.

The control apparatus basically comprises an elongated connecting rod and means for connecting the same at one end to the drive and at the other to the swage, which is superimposed gravitationally upon the saw in such a manner that the saw passes freely beneath it, as it also does beneath the grinder. Accordingly, as the drive moves the saw forward, the rod draws the swage at the same speed and for the same distance.

The herein described control comprises a motor connected to the clamping member of the swage and actuated by a trip carried by the moving swage. When the trip actuates the motor, the latter clamps the saw in working relation to the swage.

Means further are provided for actuating the swaging die when the saw has been clamped. Such means are driven by the damp with the result that when the saw is clamped, the swaging die operates automatically.

Upon conclusion of these operations, reversal of the saw drive releases the clamp, resets the die and indexes the swage backwardly one unit, ready to engage and process the next subsequent tooth.

A typical situation in which the swage control apparatus of this invention may be employed is illustrated schematically in FIG. 9.

In that figure, the saw is indicated by the numeral 10. It is mounted in a suitable guide, not illustrated, so that it may be guided in longitudinal travel. The saw is positioned with the teeth angled upwardly and rearwardly, i.e. in a direction away from the direction of motion of the saw.

The saw teeth thus travel past swaging station A and then past grinding or sharpening station B. A swage, collectively indicated at 12, is located at station A and a saw drive and tooth grinder, collectively indicated at 14, is stationed at station B. The direction of motion of the saw is counterclockwise as viewed in FIG. 9.

THE SAW DRIVE AND GRINDING UNIT

The construction of the saw drive and tooth grinding unit 14 is conventional. As indicated schematically in FIG. 7, it comprises a grinding wheel 16 fixed to a powered shaft 18. The grinding wheel is movable between an operative position wherein it contacts the saw and a retracted position wherein it is out of contact with the saw.

A reciprocating saw drive by means of which the saw is advanced incrementally is associated with the grinder assembly.

The drive is contained in a housing 20 which contains a cam 22 keyed to cam shaft 24. The cam engages a roller cam follower 26 rotatably mounted on the inner end of a lever 28. The lever is fulcrumed intermediate its ends on pivot pin 30. A push arm 32 pivotally is connected at an intermediate position to the outer end of arm 28 by means of pin 34. Push arm 32 is mounted for reciprocating movement in a sleeve 36. Its outer end is provided with a contact member 37 which engages the saw tooth gullets.

The operation of the combination grinder and drive unit thus is such that grinding wheel 16 moves first to its retracted position. Cam 22 moves clockwise. This moves arm 28 clockwise, but against the tension of a return spring 38.

Movement of arm 28 extends push arm 32 a distance equal to the distance between an adjacent pair of saw teeth. It thus advances saw 10 by an increment of one tooth, moving a new saw tooth into grinding position.

With the rotation of cam 22 beyond its working position spring 38 retracts arm 28. This in turn retracts push arm 32. Grinding wheel 16 thereupon lowers into engagement with the next tooth and sharpens it. This operation is repeated tooth by tooth until the entire saw is sharpened.

THE SWAGING UNIT

The basic concentration of saw swaging unit 12 also is conventional. Its construction is shown particularly in FIGS. 1–4.

The swage includes a swage body 40 gravitationally superimposed upon the saw. The leading end of the swage body is supported on a guide assembly 42. This member is U-shaped in inverted cross section and houses a flat plate 44 in sliding engagement with the saw teeth.

A cylindrical block 46 is bolted to the trailing end of swage body 40. The underside of the block is provided in the longitudinal diretcion with a cleft 48 dimensioned to receive the saw teeth. It also is provided with a vertical anvil bore 50 which is aligned and communicates with cleft 48; with a central, transverse die bore 52, which intercepts the inner portion of cleft 48; and with a clamp bore 54 which intercepts the outer portion of cleft 48.

An anvil 56 is seated adjustably in anvil bore 50. Its longitudinal adjustment is secured by an integral screw plug 58 threaded into the outer portion of the bore.

A swaging die 60 is mounted rotatably in die bore 52. It has an eccentric die surface 62 which lies opopsite anvil 56 and cooperates therewith in swaging the saw teeth.

Die 60 is powered for oscillating angular movement by means of a lever 64, the inner end of which is splined to an outwardly projecting section of die 60 and the outer end of which pivotally is connected to the crosshead 66 of pneumatic cylinder 68.

Cylinder 68 is double acting. Its retracting stroke is controlled by the adjustment of a screw stop 72, FIG. 1. Its advancing stroke is controlled by the setting of valve 70, FIG. 2. Valve 70 is actuated by a pilot valve 74.

Accordingly, when the pilot valve is actuated in a manner to be described hereinafter, valve 70 supplies air to cylinder 68, actuating the cylinder in a complete cycle of extension and retraction. This in turn rotates die 60 by just the proper angular amount to swage a saw tooth positioned between the die and anvil 56.

An adjustable, stationary, clamp abutment 76 is threaded into one end of clamp bore 54; a rotary screw clamp 78 with burred end 80 in the other.

The bifurcated inner end of component 82a of a bell crank lever 82, 82a receives burred end 80 of screw clamp 78. A lock bolt 84 locks the lever securely on the extension.

Accordingly, by moving lever 82, 82a clockwise as viewed in FIG. 1, screw clamp 78 is advanced against the side face of saw 10 and, cooperating with abutment 76, secures the saw during operation of the swaging die.

THE SWAGE CONTROL UNIT

The construction and mode of operation of the novel swage control unit which controls the operation of the above described conventional swage is illustrated particularly in FIGS. 1, 2, 5 and 6.

In the operation of the control, advantage is taken of the incremental driving force of push arm 32 associated with the grinder, FIG. 7, automatically to actuate the swaging unit when the saw is in proper position for swaging.

To this end there is provided an elongated connecting rod or bar 86. The downstream end of this bar pivotally is connected to push arm 32 at grinding station B by being bent at right angles and secured in bearing 88, mounted in push bar 32.

The bar extends generally parallel to the saw to swaging station A. Here its other end terminates in a clevis 90 pivotally secured by means pin 92 to the outer end of an arcuate connecting plate 94. The inner end of plate 94 is bolted to swage body 40 in the manner especially indicated in FIG. 2.

A reciprocating drive is provided for adjusting screw clamp 78 between its positions of saw clamping and saw release.

The reciprocating drive employed for this purpose comprises a double acting pneumatic cylinder 96. To enable transfer of the apparatus from one saw sharpening station to another, the base of the cylinder pivotally is connected by means of pin 98 to a channel member 100. The latter removably is attached to a floor plate 102 bolted or otherwise affixed to a stationary member such as the floor of the file room.

Removable attachment of channel 100 to floor plate 102 is obtained by providing an angular lug 104 welded to plate 102 and engageable with one end of the channel member. The other end of the channel member is secured by means of a clamp 106 releasably secured to floor plate 102 by means of screw 108.

To prevent channel 100 from sliding endwise from the operation of the cylinder, an upwardly extending dowel 110 is fixed to plate 102. It penetrates a receiving opening through channel 100.

Clamp cylinder 96 includes a piston rod 112 which is coupled to the outer end of bell crank lever component 82a by suitable means such as a pin and clevis arrangement including clevis 114, pin 116 and cotter key 118. The arrangement thus is such that by uncoupling the clevis from the lever, the apparatus may be converted to manual operation by means of lever 82. This may be desirable in certain instances.

Reciprocation of cylinder 96 thus moves clamp screw 78 between its position of saw clamping and saw release. This movement is used to advantage in actuating cylinder 68 to move swaging die 16 between its operative and inoperative positions.

For this purpose there is provided a contact finger 120. The inner end of the finger is welded to lever 82. Its outer end is arranged to contact pilot valve 74 which controls, through cylinder valve 70, the operation of die cylinder 68.

Valve means are provided for energizing clamp cylinder 96 and for coordinating its action with the operation of grinding unit 14. This valve is indicated collectively at 122 in FIGS. 2, 5 and 6. It cooperates with a slotted trigger plate 124 having an upturned end and adjustably secured to saw guide component 126 by means of bolt 128.

Valve 122 is mounted on a bracket 130 which in turn adjustably is secured to connecting rod 86 by means of bolts 132.

The valve itself comprises a valve body 134 having longitudinally therethrough a rectangular, longitudinal bore 136. Valve body 134 also is provided with a first transverse air exhaust port 140 and a second air exhaust port 142. All of these ports communicate with longitudinal bore 136 in spaced relation to each other.

A valve plate 144 slidably is received in longitudinal bore 136. It in turn is provided with a central port opening 146.

Valve plate 144 is adjustable endwise and port 146 therein is dimensioned and disposed so that it communicates with and interconnects inlet port 138 and exhaust port 140 in one position of the plate and inlet port 138 and exhaust port 142 in the other position of the plate.

Figure 2:
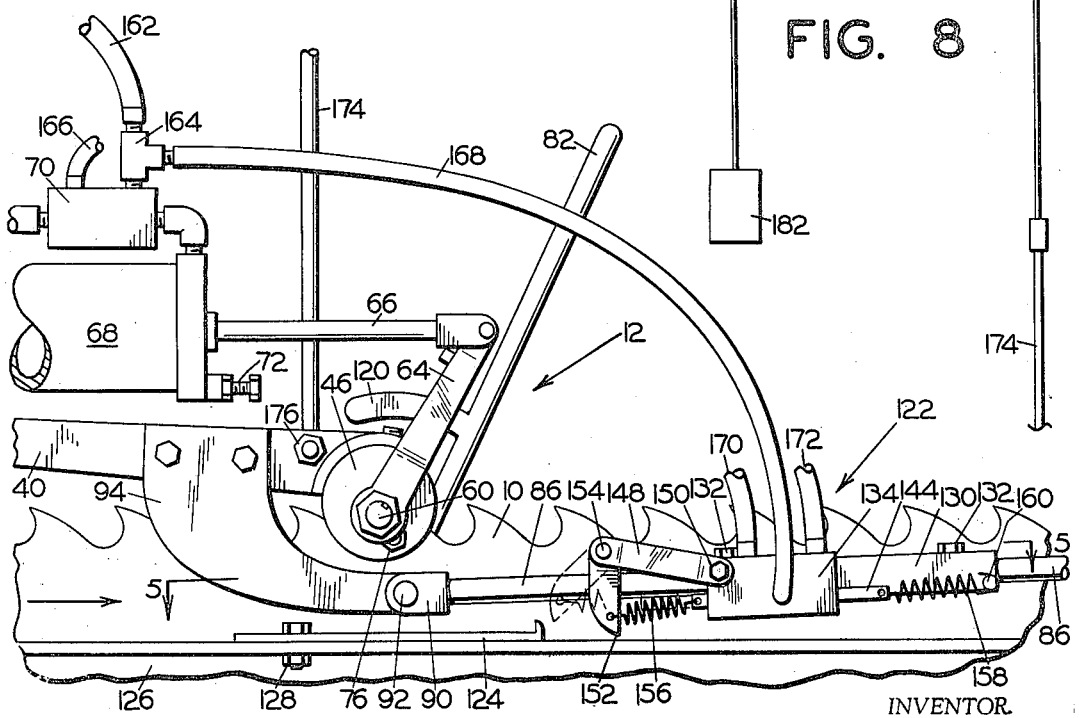
FIG. 2 is a view in side elevation of the saw swaging unit of FIG. 1, but viewed from the other side.

Adjustment of valve plate 144 between its two positions is secured by means of a spring biased trip finger, the construction of which is shown particularly in FIGS. 2 and 5.

A short arm 148 pivotally is secured at its inner end to valve body 134 by means of bolt 150. The outer end of arm 148 pivotally is secured to a trip finger 152 by pivot pin 154. The outer end of trip finger 152 is connected to one end of valve plate 144 by means of coil spring 156. The outer end of the finger thus is placed in operative proximity to valve plate 144 mounted on stationary saw guide 126 immediately below.

The other end of valve plate 144 is connected by means of spring 158 to a short post 160 extending laterally outwardly from bracket 130.

Suitable pneumatic connections are provided for operatively interconnecting die cylinder 68, its control valve 70, its pilot valve 74; and clamp cylinder 96 together with its control valve 122.

To this end there is provided an inlet hose 162 connected to an air compressor or other source of air under pressure. It communicates with a T 164. One outlet of the T is connected to pilot valve 70 fitted with the usual connections connecting it ahead of and behind the piston of cylinder 68. In addition, it is fitted with a conduit 166 which leads to pilot valve 74.

The other outlet of T 164 communicates with one end of an air hose 168 which feeds valve 122 through port 138. Hose 170 connects port 140 of the valve with clamp cylinder 96, ahead of the piston thereof. Hose 172 interconnects port 142 of valve 122 and cylinder 96, behind the piston thereof.

A further important feature of the herein described control assembly is combination counterbalancing and lateral stabilizing means having for their function insuring that the swage will move smoothly over the teeth of the saw during its advancement and that it will be stabilized laterally during such advancement as well as during operation of the swage.

Heretofore the swage operator has stabilized the swage manually by placing his hands on handles located for that purpose on opposite sides of the swage. The presently described swage may be operated similarly when it is disconnected from cylinder 96 for manual operation. However, where the swage is to be operated automatically, it is necessary that lateral stabilizing means be associated with it.

The means employed for this purpose comprise a vertical stabilizing bar 174, FIGS. 1 and 2. The lower threaded end of this bar is fixed rigidly to swage body 40 by means of nut 176. Its upper end is connected to a flexible link 178 which is reeved over pulleys 180 and connected to a counterweight 182 of predetermined magnitude. This weight is adjusted so that it partially supports the weight of the swage, insuring that the swage will pass smoothly over the saw teeth without becoming jammed. The inertia of the assembly lends lateral stability to the swage.

OPERATION

The operation of the herein described swage control unit is as follows:

Saw 10 is advanced incrementally one tooth at a time past stations A and B by reciprocating motion of push arm 32, FIG. 7. As each tooth reaches the grinding station, it is ground by grinder 16 which oscillates between retracted and operative positions.

Reciprocation of push bar 32 reciprocates in a corresponding stroke connecting rod 86 which thus drives swaging unit 12. As the swaging unit is drawn forwardly in the direction of the grinder, swaging die 60 is drawn into the pocket present between two of the saw teeth, FIG. 4.

Movement of the swaging unit actuates finger 152 which controls operation of clamp cylinder 96. During its travel, finger 152 temporarily latches against the upturned end of trip bar 124, FIG. 2. This moves slide plate 144 of valve 122 to a position in which input conduit 168 is connected to exhaust conduit 170, ahead of the piston of cylinder 96, FIG. 6.

Continued movement of valve 122 draws trip finger 152 completely over latch bar 124. In this position, springs 156, 158 return valve plate 144 to its rest position in which intake conduit 168 is connected to exhaust conduit 172, behind the piston of cylinder 96, thereby retracting the piston rod 112 thereof.

When air under pressure is fed to cylinder 96 through conduit 170, it retracts piston rod 112 of the cylinder. This in turn moves bellcrank lever 82, 82a clockwise as shown in FIG. 1. It advances screw clamp 70 into clamping engagement with saw 10, FIG. 3.

Movement of bell crank lever 82, 82a also advances contact finger 102, which extends outwardly laterally from segment 82 of the lever, FIG. 1. The end of this contact finger thereupon actuates pilot valve 74 which in turn actuates operating valve 70 of die cylinder 68, FIG. 2. The construction of this operating valve is such that it rotates die 60 in a swaging direction and then returns it to its position of rest, FIG. 4.

Thus the saw synchronously is clamped by clamping cylinder 96 and swaged by swaging cylinder 68 during the interval that grinder 16 is sharpening a previously swaged tooth.

At the conclusion of this interval, return spring 38 of the drive shifts the push arm in the reverse direction. It also pushes connecting rod 86 and swage unit 122 reversely. During this movement passage of the swage unit over the saw teeth is facilitated by the operation of guide 42, stabilizing rod 170 and counterweight 182.

The reverse movement of connecting rod 86 moves valve 122 to its original position, FIG. 2. The entire unit thus is ready for the next forward thrust of drive arm 32 whereupon the process is repeated with respect to the next succeeding tooth.

It thus is apparent that the application of the presently described swage control, I have made the swaging operation completely automatic, with the need for a separate operator of the swage eliminated. The swaging operation is accomplished efficiently and uniformly. The possibility of double swaging a tooth and jamming of the apparatus is removed. Where it is desired for some reason to swage manually, this may be done simply by uncoupling bell crank lever 82, 82a from cylinder 96.

All of these advantages are gained, furthermore, by the provision of control apparatus which may be applied to existing saw sharpening equipment without substantial modification thereof and which may be transferred rapidly and easily from one saw sharpening unit to another.

It is to be understood that the form of my invention herein shown and described is to be taken as an illustrative example of the same and that various changes in the shape, size and arrangement of parts may be resorted to without departing from the spirit of my invention or the scope of the subjoined claims.

Having thus described my invention, I claim:

1. For use with saw sharpening apparatus including guide means for supporting a saw in guided longitudinal travel with the saw teeth angled upwardly and rearwardly, saw tooth grinding means positioned at a first station in grinding relation to the saw, saw tooth swaging means including saw clamp means and swaging die means gravitationally superimposed upon the saw at a second station, and a reciprocating saw drive arranged to advance the saw in the guide means, one tooth at a time, a swage control unit comprising:
   (a) an elongated connecting rod,
   (b) first connecting means pivotally connecting one end of the rod to the saw drive,
   (c) second connecting means connecting the other end of the rod to the swaging means,
   (d) motor means adjustable between two positions and operatively connected to the saw clamp means for adjusting the same between positions of saw clamping and saw release,
   (e) motor operating means including trip means operative to actuate the motor means between the saw clamping position of the clamp means when a saw tooth is in swaging position and the clamp release position of the clamp means when the swaging operation has been completed, and
   (f) swaging die actuating means positioned for actuation by the clamp means for adjusting the die means to its swaging position as the clamp means moves to its clamping position and for returning the die means to a rest position when the clamp means returns to its position of saw release.

2. The swage control unit of claim 1 wherein the motor means comprises a reciprocating pneumatic cylinder and pneumatic valve means arranged in a pneumatic circuit with the cylinder for adjusting the cylinder and hence the clamp means between its two positions.

3. The swage control unit of claim 2 wherein the trip means comprises a contact member extending upwardly from a stationary member and the valve means comprises a valve body provided with an air inlet port and a pair if air outlet ports communicating with the pneumatic cylinder, and a valve plate having a central opening therethrough slidably mounted in the valve body with the central opening adjustable between positions connecting the intake port with the respective outlet ports, and spring biased trip finger means attached to the valve plate and positioned for contact with the trip during reciprocation of the connecting rod.

4. The swage control unit of claim 1 wherein the motor means comprises pneumatic cylinder means and including bell crank lever means having one of its component arms connected to the cylinder and its other component arm mounting a finger positioned for actuating the swaging die means upon operation of the cylinder.

5. The swage control unit of claim 4 wherein the said other component arm comprises a lever arm for manual operation of the swaging die and including releasable coupling means for releasably coupling the bell crank lever to the cylinder when manual operation is desired.

6. The swage control unit of claim 1 including counterweight means connected to the swaging means for counterbalancing its weight as it rests gravitationally superimposed upon the saw.

7. The swage control unit of claim 6 wherein the counterweight means includes a substantially vertical bar, connecting means for connecting the lower end of the bar to the swaging means, cable and pulley means connected at one end to the upper end of the stabilizing bar and a counterweight fastened to the other end of the cable and pulley means.

8. The swage control unit of claim 1 wherein the motor means comprises pneumatic cylinder means and demountable mounting means therefor, the demountable mounting means comprising a mounting plate, pivot pin means pivotally connecting the base of the cylinder to the mounting plate, a base plate, means for securing the base plate to a stationary member, and clamp means releasably clamping the mounting plate to the base plate.

References Cited

UNITED STATES PATENTS 2,528,925 11/1950 Vigneau _____ 76—54 XR
2,722,142 11/1955 Mitchell _____ 76—52
2,953,948 9/1960 Moore _____ 76—51

BERNARD STICKNEY, Primary Examiner